Dec. 3, 1963  W. J. MURRAY  3,112,564
METHOD OF FORMING A BRAZED LOCK JOINT
Filed Oct. 25, 1961

CONVENTIONAL PROCESS

INVENTOR.
WILLIAM J. MURRAY
BY AGENT
ATTORNEY

United States Patent Office 3,112,564
Patented Dec. 3, 1963

3,112,564
METHOD OF FORMING A BRAZED LOCK JOINT
William J. Murray, Dallas, Tex., assignor, by mesne assignments, to the United States of America as represented by the Secretary of the Navy
Filed Oct. 25, 1961, Ser. No. 147,697
2 Claims. (Cl. 29—470.5)

The present invention relates in general to brazing, and in particular to the formation of a brazed joint between a tubular member and a fitting such that resistance of the assembly to fracturing or other mechanical failure is increased.

It is well-known in the brazing or soldering art that marked changes in the physical characteristics of a metal occur when the latter is subjected to relatively high temperatures. Whereas, for so-called "soft soldering," it is not necessary to heat the assembly beyond a relatively low level, brazing operations involve the application of considerable heat to the region occupied by the brazing material. There is consequently a pronounced change in the properties of the members being joined, and this change usually takes the form of a reduction in the tensile strength of the material.

Such an effect is of course highly undesirable in circumstances where the assembly must resist lateral forces acting through that portion of the joint which has been subjected to heating, since if the strength of the material is lower in this region than it is throughout the remainder of the structure, it is apparent that mechanical failure will in all likelihood occur at this point. It is accordingly recognized that brazing operations in general tend to introduce weak points in an assembly, reducing the over-all reliability of apparatus in which the assembly may be incorporated.

The above problem is particularly acute in cases where a pipe or other tubular member is present, and where an end fitting is to be applied thereto. If the system of which the pipe forms a part is adapted to contain a fluid under relatively high pressure, then any weakness which may develop between the pipe and its end fitting may result in leakage of the fluid in this region. Furthermore, considerable stress occasionally exists in a pipe assembly by reason of improper support for, or positioning of, the pipes, and consequently when such stress is taken up by a welded or brazed joint the possibility of failure of the assembly cannot be disregarded.

A standard method of applying a fitting to the end of a pipe or other tubular element is to perform a so-called braze alloy groove in the fitting, this groove constituting, in effect, an enlargement of the inner diameter of the fitting over a portion of its length, so that when the fitting is placed over the tubular member with which it is to be associated, then a circumferential gap or groove is formed between the inner surface of the fitting and the outer surface of the tubular member. This so-called braze alloy groove is made accessible to an operator by virtue of a small opening extending between it and the outer surface of the fitting, and it is conventional practice to introduce into this opening a selected braze alloy normally in wire form. The standard brazing process is such that when the assembly is subjected to a sufficiently high temperature, the braze alloy flows by capillary action to fill the groove. When the heat is subsequently withdrawn, the alloy thus introduced into the groove forms a bond between the fitting and the tubular member.

One disadvantage in performing a process of this type is that the application of an amount of heat sufficient to melt the braze alloy also causes physical changes in the material of the member upon which the fitting is to be secured. In other words, the brazing process acts to anneal the material of the work piece. As an example, if the tubing upon which the fitting is to be placed is stainless steel of a type known as PH350 or PH355, then the original tensile strength of the tubing (approximately 200,000 p.s.i.) is reduced by the annealing effect of the brazing operation to a maximum of only 80,000 p.s.i. Obviously such a marked reduction in tubing strength increases the possibility of structural failure in any system in which the tubing is incorporated.

One object of the present invention, therefore, is to provide an improved form of braze joint between two structural members.

Another object of the invention is to provide a braze joint between two structural members in which the possibility of mechanical failure is reduced.

A further object of the present invention is to provide a process of forming a braze joint in which a "lock" is formed between two structural members such that the possibility of separation of the members as a result of applied pressure is minimized.

Other objects and many of the attendant advantages of this invention will be readily appreciated as the same become better understood by reference to the following detailed description when considered in connection with the accompanying drawings wherein.

Figure 1:
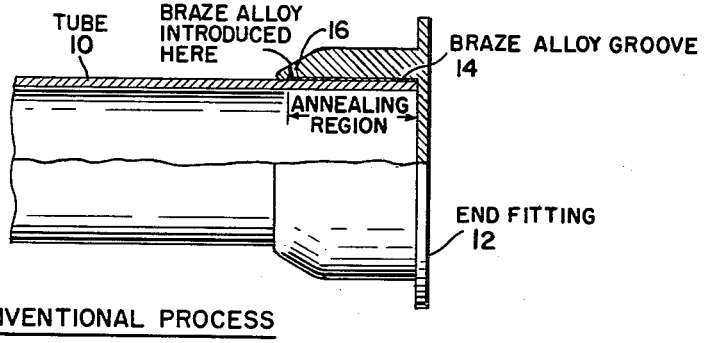
FIG. 1 is a partly-sectional view of a tubular member to which an end fitting is to be applied by a conventional process.

Referring now to the drawings, there is shown in FIG. 1 a hollow tubular member 10 having an open end to which a fitting 12 is to be secured by brazing. Consequently the fitting 12 is preformed with a braze alloy groove 14 produced by increasing the inner diameter of the fitting, so that, when the latter is in position to encircle tube 10 in the manner illustrated, there is a circumferential gap or groove formed between the inner surface of the fitting 12 and the outer surface of the tube 10. As shown in the drawings, this groove 14 extends longitudinally between the outer end of tube 10 and a point near the inner extremity of the fitting 12, considered axially or longitudinally of the tube.

Extending outwardly from the braze alloy groove 14 is an opening 16, this opening permitting the introduction thereinto of any suitable braze alloy material, conventionally in wire form. Heating of that portion of the assembly of FIG. 1 which includes the groove 14 and opening 16 will cause the braze alloy thus introduced into opening 16 to melt and flow by capillary action along groove 14 to substantially fill the latter. When the assembly cools, a bond is consequently effected between tube 10 and fitting 12 which is normally adequate as long as no pronounced strain is placed upon this particular portion of the apparatus, or as long as the fluid to be contained in tube 10 is not highly pressurized.

As above mentioned, however, the brazing process just described has the undesirable effect of weakening the material of which tube 10 is composed within a region essentially coextensive with the braze alloy groove 14. This particular section of tube 10 is thus rendered more likely to fail or fracture under severe operating conditions.

Figure 2:
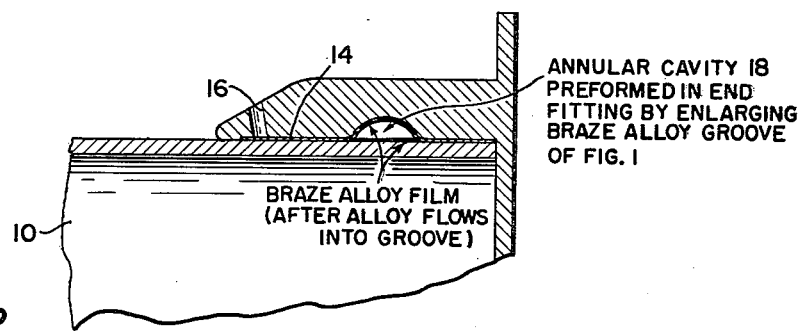
FIG. 2 is an enlarged view of a portion of FIG. 1, with the end fitting being preformed in accordance with the principles of the present invention, also showing the relationship between the fitting and the member to which it is to be attached prior to the "locking" operation.

In accordance with a feature of the present invention, the above disadvantage is largely overcome by altering the configuration of the inner surface of the end fitting 12 of FIG. 1. This alteration consists of the formation in such end fitting of an annular cavity 18 extending radially outwardly in a manner shown in FIG. 2 of the drawings. This annular cavity 18 is preformed in the end fitting 12 prior to the operation by which such fitting is placed upon tube 10. Preferably, the cavity 18 is located substantially midway between the axial extremities of the braze alloy groove 14, although such position is in no way critical and it is only necessary that it be disposed such that when a braze alloy is introduced into the opening 16, such alloy will flow upon heating not only over the outer surface of the tube 10, but also over the surface of the cavity 18 in a manner clearly brought out in FIG. 2 of the drawings. Since this film of braze alloy is extremely thin, however, the brazing operation will not fill the cavity 18 with alloy but instead will leave an open annular chamber an shown.

Figure 3:
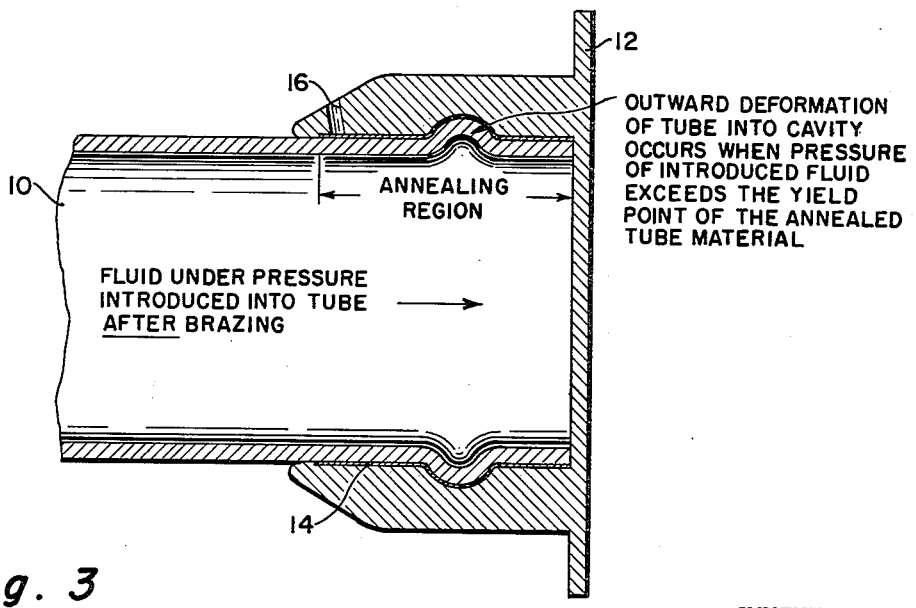
FIG. 3 is a view of the assembly of FIG. 2 following such locking operation.

In accordance with the present invention, the tube 10 is acted upon following the just-described brazing operation to develop what in effect may be termed a "lock" between it and the end fitting 12. This objective is achieved by introducing a fluid under pressure into the tube 10 when the assembly has returned to its normal ambient temperature. This pressurized fluid introduced into tube 10 will possess an outward radial component, and, if the latter is of sufficient magnitude, the material of the tube will be forced outwardly to effectively fill the cavity 18. In other words, an outward deformation of the tube into cavity 18 will occur if the pressure of the fluid in the tube is high enough to exceed the yield point of the tube material in the region where annealing has occurred during the brazing operation. It will be apparent from an inspection of FIG. 3 of the drawings that such a deformation of tube 10 in effect "locks" the fitting 12 into the tube and practically eliminates all possibility of separation between the tube and fitting. Still further, this deformation of the material of tube 10 by the pressurized fluid introduced therein has the effect of work-hardening the material, and, in practice, it has been found that such work-hardening causes the tensile strength of the tube material to be raised from is annealed figure of 80,000 p.s.i. (for example) to approximately 140,000 p.s.i. Thus the entire joint is greatly strengthened and rendered much more resistant to mechanical failure.

Since it is customary to carry out a proof-loading test following a brazing operation, the introduction of a pressurized fluid into tube 10 during such a testing process can bring about an outward deformation of the tube material into cavity 18 in the manner described above. Thus no separate step is required to achieve the advantages of the present concept, and consequently these advantages are obtainable without the expenditure of any appreciable time, effort or expense beyond that now utilized in conventional processes.

Obviously many modifications and variations of the present invention are possible in the light of the above teachings. It is, therefore, to be understood that within the scope of the appended claims the invention may be practiced otherwise than as specifically described.

I claim:

1. The process of forming a brazed joint between a fitting having an opening of cylindrical configuration and a tubular member receivable in said opening, said tubular member being capable of containing a pressurized fluid, said tubular member being relatively thin and composed of a metallic material which can be annealed at brazing temperature and subsequently work-hardened at room temperature, said fitting being composed of a metallic material substantially thicker than, and at least as hard as, said tubular member, said fitting having an annular recess therein which extends radially outwardly from a braze alloy groove of capillary dimension formed between the inner surface of said fitting and the outer surface of said tubular member when these elements are in position to be joined, said recess being of greater than capillary dimension, said process comprising introducing a braze alloy into said groove, heating at least that longitudinal portion of said assembly which is essentially coextensive with said groove to cause said braze alloy to flow by capillary action and substantially fill said groove, the heating of said assembly resulting in an annealing of that portion of the material of said tubular member proximate to the recess formed in said fitting, cooling said assembly substantially to room temperature, and then introducing a fluid under pressure into said tubular member, the pressure of the fluid so introduced exceeding the yield point of the annealed portion of said tubular member, whereby the portion of said tubular member proximate to said recess is forced outwardly into said recess to create in effect a mechanical lock between said tubular member and said fitting, while concurrently work-hardening and raising the yield point of the material of that portion of the said tubular member which is thus forced into said recess.

2. A process according to claim 1 in which the fluid introduced into said tubular member is a liquid.

References Cited in the file of this patent
UNITED STATES PATENTS

| | | |
|---|---|---|
| 653,280 | Barthels et al. | July 10, 1900 |
| 1,615,591 | Mallory | Jan. 25, 1927 |
| 1,881,867 | Nelson | Oct. 11, 1932 |
| 1,916,989 | Rader | July 4, 1933 |
| 2,040,092 | Leedy | May 12, 1936 |
| 2,050,728 | Ost | Aug. 11, 1936 |
| 2,084,207 | Lindquist et al. | June 15, 1937 |
| 2,094,495 | Robinson et al. | Sept. 28, 1937 |
| 2,545,527 | Maxwell | Mar. 20, 1951 |
| 3,045,339 | Callahan | July 24, 1962 |